United States Patent Office 3,036,103
Patented May 22, 1962

3,036,103
PREPARATION OF TRIALKYLTIN HALIDES AND TETRAALKYLTIN COMPOUNDS
William K. Johnson, Dayton, Ohio, assignor to Monsanto Chemical Company, St. Louis, Mo., a corporation of Delaware
No Drawing. Filed May 21, 1959, Ser. No. 814,687
24 Claims. (Cl. 260—429.7)

This invention relates to an improved process for the preparation of various organotin compounds containing from three to four hydrocarbon radicals per atom of tin, such as trialkyltin halides and tetraalkyltin compounds, by the treatment of an alkyltin halide with trialkylaluminum compounds.

A number of methods are presently known for the preparation of various alkyltin halides and tetraalkyltin compounds such as (1) the reaction of powdered metallic tin with alkyl halides to provide dialkyltin dihalides, generally with rather poor yield; (2) the reaction of tin tetrahalides with Grignard reagents to provide tetraalkyltin compounds, and the like; (3) the reaction of a tin-sodium alloy with an alkyl halide to provide a mixture of various organotin compounds, including tetraalkyltin, but only about 25 percent of the tin present can be converted; (4) the reaction of a magnesium-tin alloy with an alkyl halide to obtain the corresponding tetraalkyltin compound, but due to side reactions this method is not particularly useful for other than the lower alkyl-containing compounds, such as tetraethyltin; (5) the reaction of tin tetrahalides with alkyl halides and sodium metal to provide tetraalkyltin, etc., wherein a portion of the stannic halide was reduced to the stannous halide and to metallic tin; and other processes.

It is the principal object of the instant invention to provide a new method for the preparation of organotin compounds, such as trialkyltin halides and tetraalkyltin compounds. Other objects of this invention will be apparent to those skilled in the art from the following disclosure.

It has now been found that the trialkylaluminum compounds are effective reagents to introduced additional alkyl groups into an alkyltin halide, e.g. $RSnX_3$, $R_2SnX_2$ or $R_3SnX$, wherein the R group indicates the same or different alkyl radicals, and X is a halogen atom. Preferably the alkyl radicals can contain up to about 20 carbon atoms, and more preferably still up to about 12 carbon atoms. Preferably the halogen atom has an atomic number from 17 to 35, i.e. the chlorine and bromine atoms are particularly preferred. The novel reaction of this invention can be carried out in the presence or absence of an inert organic solvent, as for example, hexane, isooctane, benzene, toluene, kerosene, cyclohexane, chlorobenzene, and the like. It also has been found that the yield of the tetraalkyltin compound was greater when the alkyltin halide was added to the trialkylaluminum rather than when the trialkylaluminum was added to the alkyltin halide.

As is known in the art, the tetraalkyltin compounds subsequently can be treated with the desired amount of a stannic halide to effect the disproportionation reaction to provide the various alkyltin halide compounds:

$3R_4Sn + SnX_4 \rightarrow 4R_3SnX$
$R_4Sn + SnX_4 \rightarrow 2R_2SnX_2$
$R_4Sn + 3SnX_4 \rightarrow 4RSnX_3$ Thus, the instant process provides a series of organotin compounds which are useful directly, or as intermediates, for their biocidal activity, such as bactericidal and fungicidal activities, whereby they can be incorporated in small effective amounts in paint compositions, adhesive compositions, cleaning compositions, agricultural compositions for treatment of crops, and the like; as wood preservatives; for the production of organotin compounds useful as heat stabilizers in plastic compositions, such as polyvinyl chloride; as anti-ozone agents in conjunction with isocyanate foams; etc.

Various illustrative trialkylaluminum reagents which are suitable in the instant process are trimethylaluminum, triethylaluminum, tri-n-propylaluminum, triisopropylaluminum, tri-n-butylaluminum, triisobutylaluminum, tripentylaluminum, trihexylaluminum, trioctylaluminum, tri-(2,4,4-trimethylpentyl)-aluminum, tridecylaluminum, tridodecylaluminum, trihexadecylaluminum, trioctadecylaluminum, dimethylaluminum chloride, methylaluminum dichloride, diethylaluminum chloride, ethylaluminum dichloride, diethylaluminum bromide, ethylaluminum dibromide, and the like. Also mixed trialkylaluminum reagents can be employed, i.e. wherein two or more of the illustrative symmetrical reagents are employed simultaneously, or various different alkyl groups are present on a single aluminum atom. However, it is generally preferred that the same halogen atoms and same alkyl radicals are employed in the reactants to reduce the number of closely related products which would otherwise be obtained.

The trialkylaluminum reagents are extremely reactive and necessary precautions must be taken that they are handled and reacted in the absence of oxygen and moisture. Accordingly, the reaction system is swept with and maintained under an inert atmosphere, such as lamp-grade nitrogen, and the various materials, solvents, if employed, and equipment are maintained in an anhydrous state during the instant reaction.

To control the reaction, it is desirable that initially the temperature of the reaction mixture be maintained below about 70° C. over the period of mixing the reactants together, after which time the reaction mixture can be heated at reflux, generally at temperatures of from about 0° to about 200° C., and preferably at from about room temperature to about 150° C., but in all cases below the thermal decomposition temperature of the desired product.

Whereas both trialkyltin halides and tetraalkyltins are produced by the use of trialkylaluminum compounds, it will be noted that the trialkyltin halides tend to be the major product. However, as illustrated below, when the trialkyltin halides are further reacted with a fresh supply of trialkylaluminum the tetraalkyltin compounds are readily obtained. Thus, the $R_3Al$ is essential to alkylate $R_3SnX$ to $R_4Sn$ and the alkylaluminum halides, $RAlX_2$ and $R_2AlX$, are only capable of alkylating the alkyltin halide to the $R_3SnX$ stage even with a large excess of the alkylaluminum halide reagent and reaction temperatures up to 200° C. Accordingly, one preferred embodiment of the instant invention relates to the alkylation of a trialkyltin halide with trialkylaluminum to prepare the desired tetraalkyltin compound in high yield and the alkylaluminum halide can be further employed to raise the alkyltin halides to the trialkyltin halide stage.

Accordingly, the instant process can be illustrated by the following reactions:

$3RSnX_3 + AlR_3 \rightarrow 3R_2SnX_2 + AlX_3$
$3R_2SnX_2 + AlR_3 \rightarrow 3R_3SnX + AlX_3$
$R_3SnX + AlR_3 \rightarrow R_4Sn + R_2AlX$ The following examples are illustrative of the instant invention:

*Example 1*

A round-bottom flask was fitted with a dropping funnel, stirrer, thermometer, and reflux condenser. The equipment was dried and swept with lamp-grade nitrogen. Then 78 g. of dimethyltin dichloride was suspended in 100 ml. of dry isooctane and 17 g. of trimethylaluminum added dropwise to the stirred mixture over a period of 30 minutes, during which time the temperature of the reaction mixture was heated at reflux (from 90° to 100° C.) for 13 hours, then heating and stirring discontinued, whereby a two-phase system was observed and wherein the lower layer was a nearly colorless, somewhat viscous oil. The reaction mixture was cautiously hydrolyzed by the dropwise addition of 100 ml. of water and the oily layer separated therefrom. The aqueous layer was extracted with ether and the ether extract combined with the oily layer, dried, and the ether and isooctane removed by fractional distillation. About 20 g. of impure tetramethyltin and 31 g. of trimethyltin chloride were recovered. A portion of the latter was converted to trimethyltin fluoride by reaction with potassium fluoride and analyzed.

Calculated for $C_3H_9FSn$: C, 19.71; H, 4.96; F, 10.40. Found: C, 19.46; H, 4.91; F, 10.21.

Example 2

In similar manner to Example 1, 42.5 g. of di-n-butyltin dichloride and 50 ml. of dry hexane were introduced into the closed reaction vessel and 19 g. of triisobutylaluminum added dropwise thereto over a period of about 15 minutes while the temperature of the reaction mixture was held at from about 40° to about 45° C. Then the reaction mixture was heated at reflux for 8 hours, cooled, treated by the dropwise addition of 100 ml. of water, the aqueous layer separated, extracted with hexane, the hexane extract combined with the hexane phase, dried, and the hexane removed by fractional distillation. The colorless product consisted of a mixture of di-n-butyldiisobutyltin and di-n-butylisobutyltin chloride.

Calculated for $C_{16}H_{36}Sn$: C, 55.36; H, 10.46; Cl, 0. Calculated for $C_{12}H_{27}ClSn$: C, 44.27; H, 8.36; Cl, 10.89. Found: C, 49.46, 49.27; H, 9.27, 9.26; Cl, 5.92, 5.86.

A 16.3-g. portion of the aforesaid reaction mixture was dissolved in 25 ml. of ethanol and added slowly in a thin stream to a stirred aqueous solution of 4.35 g. potassium fluoride in 10 ml. of water. The precipitate formed was separated by filtration, washed with ethanol and dried in an oven at 100° C. The white product was recrystallized from ethanol and found to have a sealed-tube melting point of 264–265° C. Elemental analysis confirmed the composition of the tributyltin fluoride.

Calculated for $C_{12}H_{27}FSn$: C, 46.63; H, 8.81; F, 6.15. Found: C, 46.42; H, 9.02; F, 6.26.

Example 3

A 84.6-g. sample of n-butyltin trichloride was introduced into the closed reaction vessel of Example 1, and 64 g. of tri-n-butylaluminum was added dropwise thereto over a period of about 35 minutes, during which time the reaction temperature increased from about 30° to about 52° C. The reaction mixture was heated at a pot temperature of from about 140° to about 145° C. with continued stirring for about 4 hours, then cooled to room temperature and cautiously hydrolyzed with 100 ml. water. Two completely colorless liquid layers were obtained and the oily layer separated. The remaining aqueous layer was extracted with two portions of ether, the ether extract combined with the oily phase, dried, and the ether removed by fractional distillation. The principal reaction product was recovered in an amount of 86 g. and had a boiling point of from about 155° to about 160° C. at 15 mm. mercury pressure and a refractive index $N_D^{25}$ of 1.4880.

Calculated for $C_{12}H_{27}ClSn$: C, 44.27; H, 8.36; Cl, 10.89. Found: C, 45.03; H, 8.48; Cl, 10.60.

Example 4

A 81.4-g. sample of the tri-n-butyltin chloride of Example 3 was introduced into the reaction vessel of Example 1, and 53 g. of tri-n-butylaluminum was slowly added thereto dropwise over a period of about 30 minutes, during which time the temperature of the stirred reaction mixture increased from about 25° to about 46° C. Thereafter the reaction mixture was heated to about 100° C. for 2 hours, then cooled to room temperature, cautiously treated with 100 ml. of dry ether and hydrolyzed by the dropwise addition of 50 ml. of a 10 percent aqueous solution of hydrogen chloride followed by 50 ml. of water. The colorless two-phase system was allowed to settle and the two phases separated. The aqueous layer was then extracted with two 20-ml. portions of ether, the ether extract combined with the organic phase, dried over anhydrous magnesium sulfate, filtered, and the ether removed by fractional distillation. The tetra-n-butyltin having a boiling point of from about 160° to 165° C. at 20 mm. of mercury pressure, and a refractive index $N_D^{25}$ of 1.4711 was recovered in an amount of 76 g.

Calculated for $C_{16}H_{36}Sn$: C, 55.36; H, 10.45; Sn, 34.20. Found: C, 55.40; H, 10.29; Sn, 34.09.

Example 5

A 96.5-g. sample of dibutyltin dichloride was introduced into the reaction vessel of Example 1 and 93 g. of tri-n-octylaluminum added thereto over a period of about 40 minutes during which time the temperature increased from about 26° to 70° C. The resulting viscous liquid reaction mixture was then heated at a pot temperature of from about 85° to 90° C. for a period of 18 hours. The reaction mixture was then cautiously hydrolyzed by the addition of 100 ml. of water thereto, stirred at room temperature for 2 hours, and the two phases allowed to separate. The clear oily phase was removed, the aqueous layer extracted with ether, the ether extract combined with the oily phase, dried, and the ether removed by fractional distillation. A fraction of octane, B.P. 118 to 130° C., was also recovered. The principal organotin compounds were dibutyl-n-octyltin chloride and dibutyl-di-n-octyltin.

Example 6

A 120-g. sample of di-n-octyltin dichloride was introduced into the reaction vessel of Example 1 and 74 g. of tri-n-octylaluminum was added dropwise thereto over a period of about 15 minutes while the temperature within the pot increased from 24 to 55° C. The yellowish fluid reaction mixture was then heated at about 150° C. for 6 hours, cooled, and hydrolyzed by the cautious dropwise addition of 100 ml. of water. The clear two-phase system was allowed to separate and the oily phase removed. The aqueous phase was then extracted with two 75-ml. portions of ether, the ether extract combined with the oily phase, dried, and the ether removed by fractional distillation. The straw colored liquid reaction mixture having a boiling point above 240° C. at 0.4 mm. mercury pressure was obtained in an amount of 149 g., and had a refractive index $N_D^{25}$ of 1.4758. This product was found to be a mixture of tri-n-octyltin chloride and tetra-n-octyltin.

Calculated for $C_{32}H_{68}Sn$: C, 67.23; H, 11.99; Cl, 0. Calculated for $C_{24}H_{51}ClSn$: C, 58.38; H, 10.41; Cl, 7.18. Found: C, 61.17; H, 10.82; Cl, 4.71.

Example 7

A 114-g. sample of dibutyltin dichloride was dissolved in 150 ml. of toluene and the solution introduced into the reaction vessel of Example 1. Then 28 g. of triethylaluminum was added thereto dropwise over a period of about 1 hour, during which time the reaction mixture was held at a temperature of from about 35° to about 40° C. by external cooling. The reaction mixture was heated slowly to 70° C. and then the temperature was raised and held at about 95° to about 100° C. for 4 hours. The cooled reaction mixture was hydrolyzed by the dropwise addition of 100 ml. of water, effecting a two-phase system which was allowed to separate and the organic phase removed therefrom. The aqueous phase was extracted with two 25-ml. portions of toluene, the toluene extract combined with the organic phase, dried, and the toluene removed therefrom by fractional distillation.

There was obtained 100 g. of product identified as dibutylethyltin chloride.

Calculated for $C_{10}H_{23}ClSn$: C, 40.37; H, 7.79; Cl, 11.90. Found: C, 39.98; H, 7.53; Cl, 12.21.

*Example 8*

A 75 g. sample of ethyltin trichloride was introduced into the reaction vessel of Example 1 and 77 g. of ethylaluminum sesquichloride [$(C_2H_5)_3Al_2Cl_3$] was added dropwise thereto over a period of 1.5 hours while the reaction temperature increased to 70° C. The reaction mixture was stirred for two hours without applying any external heat source, other than ambient room temperature, and the cream colored mixture was then treated with 100 ml. of ether. Thereafter the reaction mixture was cautiously hydrolyzed by the addition of 80 ml. of a 5 percent aqueous solution of hydrogen chloride. The organic phase was separated, dried, and the ether removed therefrom by fractional distillation. There was recovered 52 g. of triethyltin chloride, which had a refractive index $N_D^{25}$ of 1.5042.

Calculated for $C_6H_{15}ClSn$: C, 29.87; H, 6.27; Cl, 14.70. Found: C, 30.07; H, 6.50; Cl, 14.89.

I claim:

1. A method of preparing trialkyltin halides and tetraalkyltin compounds comprising the reaction of a member of the group consisting of alkyltin trihalides, dialkyltin dihalides, trialkyltin halides, and mixtures thereof with a member of the group consisting of alkyl aluminum dihalides, dialkylaluminum halides, trialkylaluminum compounds, and mixtures thereof in an inert atmosphere under substantially anhydrous conditions, and wherein the halide atoms have an atomic number from 17 to 35.

2. The method of claim 1, wherein the alkyl radicals contain up to 20 carbon atoms and the reaction is carried out over a temperature range of from about room temperature up to about 200° C.

3. A method of preparing trialkyltin halides comprising the reaction of an alkyltin halide containing less than three alkyl radicals per atom of tin with an alkylaluminum halide in an inert atmosphere under substantially anhydrous conditions, and wherein the halide atoms have an atomic number from 17 to 35, the alkyl radicals contain up to 20 carbon atoms, and the reaction is carried out over a temperature range of from about room temperature up to about 200° C.

4. The method of claim 3, wherein all of the alkyl radicals are alike.

5. The method of claim 3, wherein the halide atoms are chlorine.

6. The method of claim 3, wherein the halide atoms are bromine.

7. The method of claim 3, wherein the reaction is carried out in the presence of an anhydrous inert solvent.

8. The method of claim 7, wherein the solvent is hexane.

9. The method of claim 7, wherein the solvent is isooctane.

10. The method of claim 7, wherein the solvent is toluene.

11. A method of preparing tetralakyltin compounds comprising the reaction of substantially equimolecular quantities of a trialkyltin halide with a trialkylaluminum compound in an inert atmosphere under substantially anhydrous conditions, and wherein the halide atom has an atomic number from 17 to 35, the alkyl radicals contain up to 20 carbon atoms, and the reaction is carried out over a temperature range of from about room temperature up to about 200° C.

12. The method of claim 11, wherein all of the alkyl radicals are alike.

13. The method of claim 11, wherein the halide atom is chlorine.

14. The method of claim 11, wherein the halide atom is bromine.

15. The method of claim 11, wherein the reaction is carried out in the presence of an anhydrous inert solvent.

16. The method of claim 15, wherein the solvent is hexane.

17. The method of claim 15, wherein the solvent is isooctane.

18. The method of claim 15, wherein the solvent is toluene.

19. A method of preparing a tetraalkyltin compound consisting essentially of the reaction of an alkyltin trihalide with substantially a molequivalent amount of a trialkylaluminum compound, wherein the halide is selected from the group consisting of chloride and bromide and the alkyl radicals contain up to 20 carbon atoms, in an inert atmosphere under substantially anhydrous conditions and the reaction is carried out over a temperature range of from about room temperature up to about 200° C.

20. The method of claim 19, wherein the halide is chloride.

21. The method of claim 20, wherein the alkyl radicals are the methyl radical.

22. The method of claim 20, wherein the alkyl radicals are the ethyl radical.

23. The method of claim 20, wherein the alkyl radicals are the n-butyl radical.

24. The method of claim 20, wherein the alkyl radicals are the n-octyl radical.

References Cited in the file of this patent

UNITED STATES PATENTS

| | | |
|---|---|---|
| 2,675,399 | Ramsden | Apr. 13, 1954 |
| 2,835,689 | Ziegler et al. | May 20, 1958 |

FOREIGN PATENTS

| | | |
|---|---|---|
| 1,120,344 | France | Apr. 16, 1956 |

OTHER REFERENCES

Gilman et al.: "Recueil des Travaux Chim.," volume 55, 1936, pages 133–144.

Gilman: Organic Chemistry, vol. I, 2nd edition (1943), page 553.